US008553763B2

(12) United States Patent
Auyeung et al.

(10) Patent No.: US 8,553,763 B2
(45) Date of Patent: Oct. 8, 2013

(54) ITERATIVE COMPUTATION OF ADAPTIVE INTERPOLATION FILTER

(75) Inventors: Cheung Auyeung, Sunnyvale, CA (US); Ali Tabatabai, Cupertino, CA (US)

(73) Assignee: Sony Corporation, Tokyo (JP)

( * ) Notice: Subject to any disclaimer, the term of this patent is extended or adjusted under 35 U.S.C. 154(b) by 576 days.

(21) Appl. No.: 12/797,873

(22) Filed: Jun. 10, 2010

(65) Prior Publication Data
US 2011/0305276 A1 Dec. 15, 2011

(51) Int. Cl.
*H04N 7/12* (2006.01)

(52) U.S. Cl.
USPC .................................................. 375/240.03

(58) Field of Classification Search
USPC .................................................. 375/240.03
See application file for complete search history.

(56) References Cited

U.S. PATENT DOCUMENTS

| | | | |
|---|---|---|---|
| 2004/0076333 A1* | 4/2004 | Zhang et al. | 382/238 |
| 2004/0161035 A1* | 8/2004 | Wedi | 375/240.12 |
| 2004/0184541 A1 | 9/2004 | Brockmeyer et al. | |
| 2005/0196062 A1 | 9/2005 | Cho et al. | |
| 2007/0058713 A1 | 3/2007 | Shen et al. | |
| 2007/0058718 A1 | 3/2007 | Shen et al. | |
| 2007/0171969 A1 | 7/2007 | Han et al. | |
| 2008/0212677 A1 | 9/2008 | Chen et al. | |
| 2009/0257670 A1 | 10/2009 | Chiu et al. | |
| 2010/0002770 A1* | 1/2010 | Motta et al. | 375/240.16 |
| 2010/0111431 A1 | 5/2010 | Gharavi-Alkhansari et al. | |

FOREIGN PATENT DOCUMENTS

| | | |
|---|---|---|
| EP | 236 519 A1 | 3/1986 |
| WO | 2008148272 A1 | 12/2008 |

OTHER PUBLICATIONS

Wedi, T.—"Adaptive Interpolation Filter for Motion Compensated Hybrid Video Coding"—Picture Coding Symposium, Seoul, Korea, 2001, 4 pages.
Bjontegaard, G.—"Calculation of average PSNR differences between Rd-curves" ITU—Telecommunications Standardization Sector, Study Group 16, Question 6, Video Coding Experts Group, 13th Meeting, Austin, TX, Apr. 2-4, 2001.
Matsuda, I. et al.—"Block Matching-Based Motion Compensation with Arbitrary Accuracy Using Adaptive Interpolation Filters"—14th Euro Signal Processing Conf., Florence, Italy, Sep. 4-8, 2006, 5 pages.
Kanumuri, S. et al.—"Fast super-resolution reconstructions of mobile video using warped transforms and adaptive thresholding"—Proc. of the SPIE, vol. 6696, 13 pages, Oct. 2007.
Vatis, Y. et al.—"Two-dimensional non-separable Adaptive Wiener Interpolation Filter for H.264/AVC"—ITU Telecommunications Standardization Sector, Study Group 16, Question 6, Video Coding Experts Group, 26th Meeting, Busan, KR, Apr. 16-22, 2005.
Yi, Y.—"Simplified and Fast Full-Pel and Sub-Pel Motion Estimation for Video Coding"—Dissertation, Santa Clara University, Dec. 1, 2005, 174 pages.

(Continued)

Primary Examiner — Joseph Ustaris
Assistant Examiner — Anner Holder
(74) Attorney, Agent, or Firm — John P. O'Banion

(57) ABSTRACT

The invention is an apparatus and method for estimating an optimized sub-pixel interpolation filter using iterative estimations as needed for sub-pixel motion compensation and motion estimation in a video codec for improving coding efficiency. Multiple iterations of adaptive interpolation filter estimation are performed including more than one iteration based on sub-pixel motion vectors. During testing of the inventive apparatus and method on various video segments, average bit rate reductions were exhibited of approximately 5%.

20 Claims, 6 Drawing Sheets

(56) References Cited

OTHER PUBLICATIONS

Cai, C. et al.—"Fast motion estimation for H.264"—Abstract only—Signal Processing, Image Communications, vol. 24, No. 7, Sep. 2009, pp. 630-636.

Li, Z.—"New methods for motion estimation with applications to low complexity video compression"—Abstract only—Purdue University, Published 2005.

Lee, Y.M. et al.—"Improved Motion Estimation Using Early Zero-Block Detection"—EURASIP Jour. on Image and Video Processing, vol. 2008, 8 pages.

United States Patent and Trademark office (USPTO), International Search Report and Written Opinion issued on Nov. 22, 2011 including claims searched, related PCT Application No. PCT/US2011/038612, pp. 1-12.

United States Patent and Trademark office (USPTO), International Search Report and Written Opinion issued on Dec. 6, 2011 including claims searched, related PCT Application No. PCT/US2011/045292, pp. 1-11.

* cited by examiner

ITERATIVE COMPUTATION OF ADAPTIVE INTERPOLATION FILTER

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to sub-pixel interpolation within video encoding, and more particularly to iterative computation of adaptive interpolation filters for sub-pixels of a picture processed within a video codec.

2. Description of Related Art

A video codec encodes a sequence of video frames which each have a plurality of pixels having corresponding pixel values. The encoding process generally refers to converting pixel values of a frame according to one or more encoding approaches into an output bit stream which can be received separately in time and/or space for decoding into frames which closely approximate the original frames to an acceptable error level.

Predictive encoding predicts elements of a frame based on prior decoded frames and generates difference signals between predicted and original frames. The difference may be further compressed and sent as an encoded signal. The decoder similarly performs prediction, therein reducing data transfer between encoder and decoder, and adds the difference signals to decode the signal and recreate the original frames to a desired or sufficient degree of accuracy.

Further compression is achieved in response to motion compensation in which blocks of one frame can be utilized to predict blocks in other frames and locations thereof, to increase compression. The prediction comprises a displacement referred to as a motion vector. Motion vectors are often specified in terms of pixel positions, and even for predicting movement to the granularity of sub-pixels. Sub-pixel motion estimations require that the image frame also be generated at sub-pixel granularity, even though the image sensor hardware itself may only generate a single pixel for each pixel position.

Sub-pixel motion estimation requires that additional sub-pixel values be generated from the source pixels, such as within an interpolation process which is often used for generating sub-pixel values. Interpolation generally entails processing pixel values surrounding a given pixel and interpolating characteristics from which the sub-pixels are estimated. The default level of resolution for motion estimation under MPEG-4 is typically a half pixel (Hpel) (where "pel"=picture element=pixel), while quarter pixel (Qpel), and other resolutions can be supported.

Interpolation filters are typically utilized to perform motion estimation and compensation of sub-pixel values (fractional pel resolution). In one approach, a horizontal or vertical 6-tap Wiener interpolation filter is first used to calculate half-pel positions, then another filter is applied, such as a bilinear filter, to obtain quarter-pel positions. An adaptive interpolation filter approach has also been proposed in which the filter is independently estimated for each image, to take into account the alteration of image signal properties, in particular aliasing, toward minimizing predictive error energy. Displacement vectors estimated in a first iteration are then used in further iterations using other interpolation filters.

For example, toward improving video encoding, the fixed encoding of AVC, was replaced in the KTA 1.8 standard with the ability to dynamically change the interpolation filter as seen in FIG. 1. The KTA 1.8 codec estimates the filter coefficients in a fixed two-pass algorithm, in which it uses a pre-determined (fixed) interpolation filter, and then estimates an adaptive interpolation filter based on the motion vectors from the fixed interpolation. In contrast to a fixed filter, the adaptive filter is adaptive by virtue of its ability to change from frame to frame as the video sequence progresses.

More specifically, in the first pass, the predetermined interpolation filter from AVC is used to compress the current picture and to estimate the optimal interpolation filter based on the current sub-pixel motion vectors. In the second pass, the estimated adaptive interpolation filter (AIF) from the first pass is used to replace the AVC interpolation filter to compress the current picture again. Then the KTA 1.8 decides whether the coded representation of the picture in the first pass or the second pass should be selected as the final representation of the picture. In this fixed two pass algorithm, the adaptive interpolation filter is intended to improve the AVC interpolation filter to increase coding efficiency. In KTA 1.8, the adaptive interpolation filter is computed in a single iteration from the fixed motion vectors and used to encode the picture in the second pass. However, it is desirable to obtain further compression gains within the encoded video without the need to sacrifice quality.

Accordingly, a need exists for a sub-pixel interpolation mechanism which increases coding efficiency and is readily determined. The present invention fulfills that need and is particularly well-suited for increasing coding efficiency within a codec following advanced video coding standards.

BRIEF SUMMARY OF THE INVENTION

An apparatus and method are described which iteratively estimate an optimal sub-pixel interpolation filter for performing sub-pixel motion compensation and motion estimation in a video codec toward increasing coding efficiency, such over those designed according to the Advanced Video Coding (AVC) and ITU/KTA 1.8 video codec standards.

In pursuing the present invention, certain shortcomings of the KTA 1.8 approach have been appreciated. For example, the use of sub-pixel motion vectors in a second pass, as determined in a first pass, are considered to introduce a source of error which decreases optimization. As a result, a disparity can arise between the interpolation filter in the second pass and the sub-pixel motion vectors in the second pass, which lead to a coding loss. Furthermore, it has been found that configuring the codec to utilize multiple interpolation passes with sub-pixel motion compensation and estimation, provides significant coding gains.

In the present invention, a first encoding pass is performed on the current picture with a predetermined interpolation filter and pixel level motion estimation and compensation are performed. After this first pass, then at least one encoding iteration is performed in which an adaptive iteration filter is estimated, as well as estimating sub-pixel motion estimation and compensation. An iteration counter tracks the number of these iterations which are performed. Preferably, more than one of these adaptive iteration filter estimation passes is performed, and it has been found that with three of these iteration passes the encoding is substantially optimized. It should be appreciated that the optimum number of iterations "N" is determined by how fast the results converge in the optimization process. The number of iteration passes can be selected according to the present invention based on a predetermined number of passes (as described), or selected in response to information obtained during training or in response to other inputs.

The invention is amenable to being embodied in a number of ways, including but not limited to the following descriptions.

One embodiment of the invention is an apparatus for optimizing encoding in a video codec, comprising: (a) a computer configured for receiving a video having a plurality of pictures; (b) a memory coupled to the computer; and (c) programming configured for retention in the memory and executable on the computer for, (c)(i) performing first pass encoding of the plurality of pictures within the video in response to executing transforms, quantization, and filtering by a predetermined interpolation filter optimized for sub-pixel motion vectors, (c)(ii) performing a first estimation of an interpolation filter optimized for pixel and sub-pixel motion vectors to create a first pass encoded representation, (c)(iii) performing at least a second estimation of interpolation filter in an n-th iteration optimized for sub-pixel motion vectors determined in the n-th iteration, (c)(iv) encoding the current picture again in a final n+1th iteration pass to create a final pass encoded representation, (c)(v) selecting either the first pass encoded representation or the final pass encoded representation as an optimally efficient encoded representation for the current picture, and (c)(vi) outputting an encoded video stream of the optimally efficient encoded representation.

In at least one implementation the encoding comprises a transform, a quantization, an inverse quantization, and an inverse transform. In at least one implementation the estimation of an interpolation filter is defined in response to a set of filter coefficients. In at least one implementation these filter coefficients are embedded within the encoded video stream. In at least one implementation the apparatus is configured for dynamically changing the interpolation filter on a picture-by-picture (frame-by-frame) basis as the video is encoded. In at least one implementation the apparatus determines if the n-th iteration is the last iteration prior to encoding the current picture again. In at least one implementation, the last iteration is determined on the basis of comparing a threshold value, (e.g., N) to determine if the n-th iteration is the last iteration prior to encoding the current picture again.

One embodiment of the invention is an apparatus for optimizing encoding in a video codec, comprising: (a) a computer configured for receiving a video having a plurality of pictures; (b) a memory coupled to the computer; and (c) programming executable on the computer for, (c)(i) encoding the plurality of pictures within the video in response to executing transforms and quantization, and in response to using a predetermined interpolation filter optimized for pixel level motion vectors and sub-pixel motion vectors, (c)(ii) performing a first estimation of an interpolation filter optimized for sub-pixel motion vectors to create a first pass encoded representation, each of the estimations of an interpolation filter is defined in response to a set of filter coefficients, (c)(iii) performing at least a second estimation of interpolation filter in an n-th iteration optimized for sub-pixel motion vectors determined in the n-th iteration, (c)(iv) determining that the n-th iteration is the last iteration prior to encoding the current picture again, (c)(v) encoding the current picture again in a final n+1th iteration pass to create a final pass encoded representation, (c)(vi) selecting either the first pass encoded representation or the final pass encoded representation as an optimally efficient encoded representation for the current picture, and (c)(vii) outputting an encoded video stream of the optimally efficient encoded representation.

In at least one implementation the encoding comprises a transform, a quantization, an inverse quantization, and an inverse transform. In at least one implementation, the programming executable on the computer for compressing and embedding the set of filter coefficients within the encoded video stream. In at least one implementation, the apparatus is configured for dynamically changing the interpolation filter on a picture-by-picture basis as the video is encoded. In at least one implementation the number of iterations n is determined in response to comparing the n-th iteration against a threshold value N to determine if the n-th iteration is the last iteration prior to encoding the current picture again.

One embodiment of the invention is a method for optimizing encoding in a video codec, comprising: (a) encoding a current picture within a video using transforms and predictions and in response to using a predetermined interpolation filter optimized for pixel level motion vectors; (b) performing a first estimation of an interpolation filter optimized for pixel level motion vectors and sub-pixel motion vectors to create a first pass encoded representation; (c) performing at least a second estimation of interpolation filter in an n-th iteration optimized for sub-pixel motion vectors determined in the n-th iteration; (d) encoding the current picture again in a final n+1th iteration pass to create a final pass encoded representation; (e) selecting either the first pass encoded representation or the final pass encoded representation as an optimally efficient encoded representation for the current picture; and (f) outputting an encoded video stream of the optimally efficient encoded representation.

In at least one implementation the encoding comprises a transform, a quantization, an inverse quantization, and an inverse transform. In at least one implementation, the estimation of an interpolation filter is defined in response to a set of filter coefficients, which can be embedded within the encoded video stream. In at least one implementation, the interpolation filter is dynamically changed on a picture-by-picture basis as the video is encoded. In at least one implementation, it is determined if the n-th iteration is the last iteration prior to encoding the current picture again, such as in response to comparing it against a threshold value N. In at least one implementation, n is equal to or greater than four, such as for achieving an average bitrate reduction of 5% over the first estimation for the first P picture.

The present invention provides a number of beneficial elements which can be implemented either separately or in any desired combination without departing from the present teachings.

An element of the invention is an apparatus and method for increasing encoding efficiency using a novel form of estimating adaptive interpolation filters based on sub-pixel motion vectors.

Another element of the invention is performing of multiple estimations of the adaptive interpolation filters based on updated sub-pixel motion estimations and compensation.

Another element of the invention is determining the number of iterations to achieve a desired level of optimized compression.

A still further element of the invention is that the inventive apparatus and method can be applied to a variety of video coding applications, codecs and so forth.

Further elements of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Referring more specifically to the drawings, for illustrative purposes the present invention is embodied in the apparatus generally shown in FIG. 2 through FIG. 6. It will be appreciated that the apparatus may vary as to configuration and as to details of the parts, and that the method may vary as to the specific steps and sequence, without departing from the basic concepts as disclosed herein. Furthermore, elements represented in one embodiment as taught herein are applicable without limitation to other embodiments taught herein, and combinations with those embodiments and what is known in the art.

Figure 2:
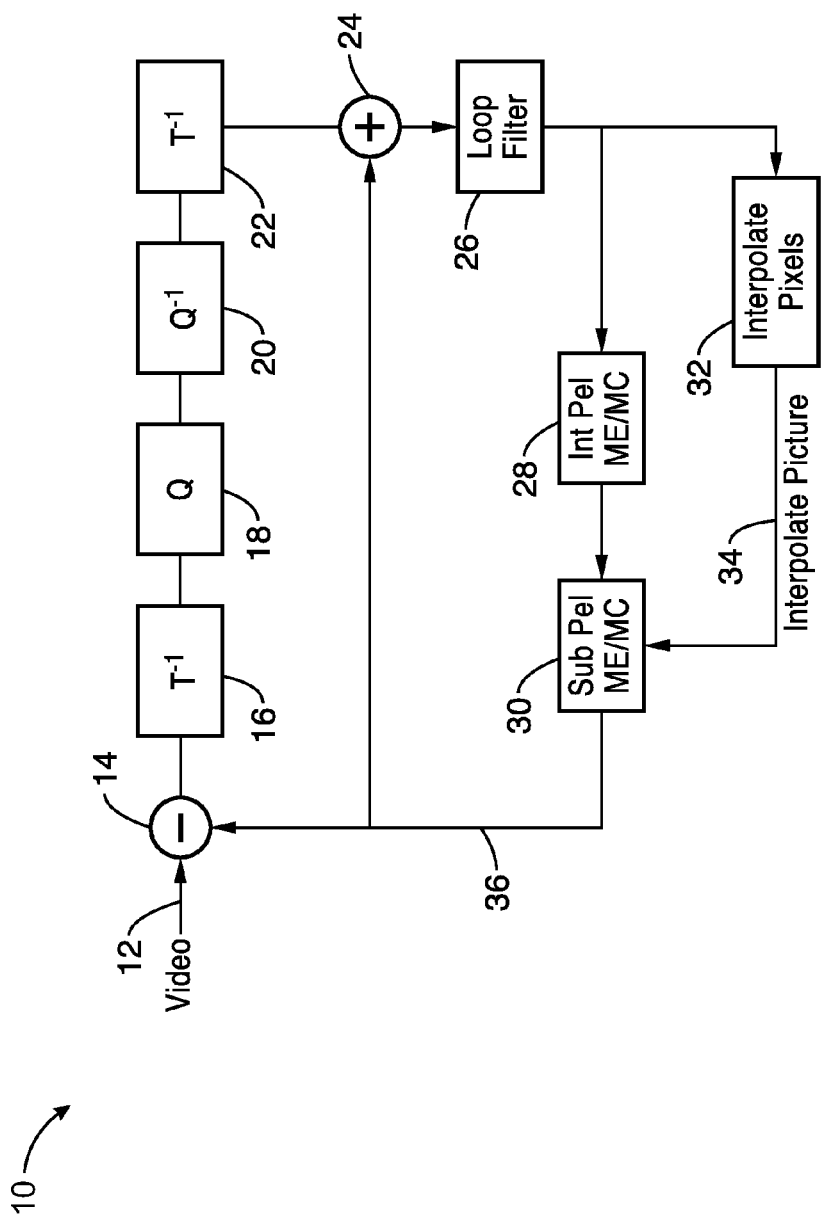
FIG. 2 is a schematic of picture encoding using adaptive interpolation within a video encoding process, showing pixel interpolation used in sub-pixel motion estimation and compensation.

FIG. 2 illustrates a general process 10 of estimating interpolation filters and performing motion estimation and compensation at the pixel and sub-pixel levels. Frames of video 12 are compared 14 with prior encoding to produce a difference signal between the original and predicted frames which is subject to execution of a transform 16, a quantization 18, an inverse quantization 20 and upon which an inverse transform 22 is executed to produce an output which is summed 24 with a prior input and received by a loop filter 26. Loop filter 26 is optimized for motion estimation (ME) and motion compensation (MC), at an integer pixel (pixel level) 28, and sub-pixel level 30. Pixel interpolation 32 is performed to generate an interpolated picture 34 which is used in sub-pixel ME/MC 30 having output 36.

Apparatus and methods of the invention are configured for iteratively estimating the sub-pixel interpolation filter needed for sub-pixel motion estimation and compensation in a video codec for improving coding efficiency. The invention provides coding efficiency gains over AVC and ITU/KTA 1.8 by improving the interpolation filter for sub-pixel motion compensation and motion estimation in the codec.

In the AVC video codec, a fixed interpolation filter was defined by the standard for sub-pixel motion compensation. To provide better coding efficiency than AVC, the ITU/KTA1.8 video codec can dynamically change the interpolation filter (adaptive).

Figure 1:
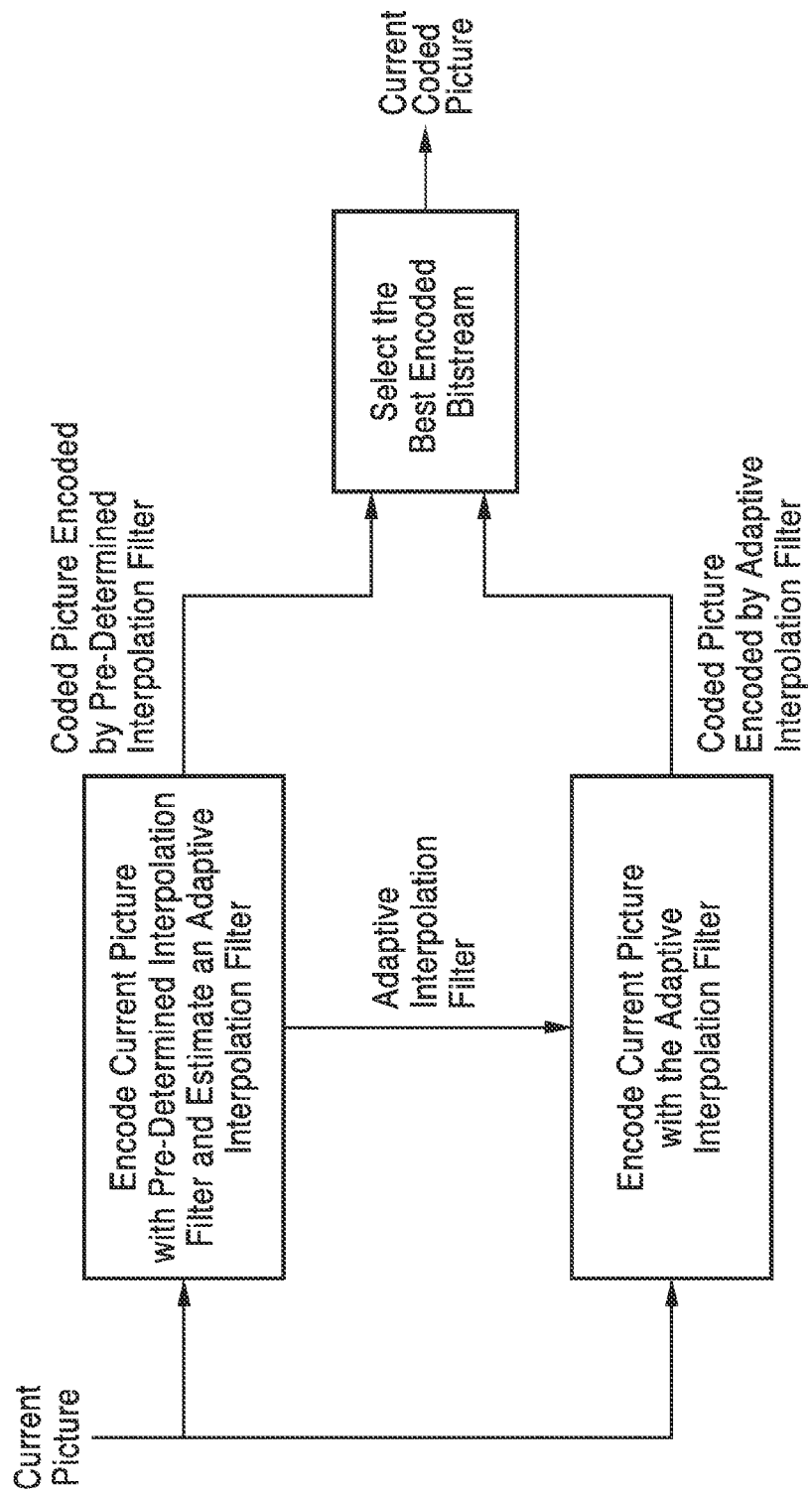
FIG. 1 is a schematic of conventional estimation of an adaptive interpolation filter.

As seen in FIG. 1, the ITU/KTA 1.8 codec estimates filter coefficients in a fixed two pass execution process. In the first pass, the interpolation filter from AVC is utilized to compress the current picture and to estimate the optimal interpolation filter which is optimized for the current sub-pixel motion vectors. It will be appreciated that determination of sub-pel motion vectors can be performed according to any desired technique, many of which are well known in the art. In the second pass, the estimated adaptive interpolation filter from the first pass is utilized to replace the AVC interpolation filter to compress the current picture again. Then a decision is made under ITU/KTA 1.8 to determine whether the coded representation of the picture in the first pass or the second pass should be selected as the final representation of the picture. In this two pass algorithm, the adaptive interpolation filter is intended to improve the AVC interpolation filter and to improve coding efficiency over that of AVC. In ITU/KTA 1.8, the adaptive interpolation filter is computed in one iteration during the first pass and is then used to encode the picture in the second pass. There are no interpolation estimations in the second pass, which could introduce new sub-pel motion vectors in the second pass that are not necessarily the same as the ones in the first pass.

One problem with the fixed two pass algorithm is that the adaptive interpolation filter is optimized for the sub-pixel motion vectors of the first pass, and thus cannot be optimized for the sub-pixel motion vectors in the second pass. Therefore, disparity may exist between the interpolation filter in the second pass and the sub-pixel motion vectors in the second pass.

In contrast to the configuration under the ITU/KTA 1.8 standard, the present invention estimates the interpolation filter by N>1 iterations (N+1 passes). Testing of the present invention has verified that a minimum of two estimation iterations are required to improve coding efficiency.

Figure 3:
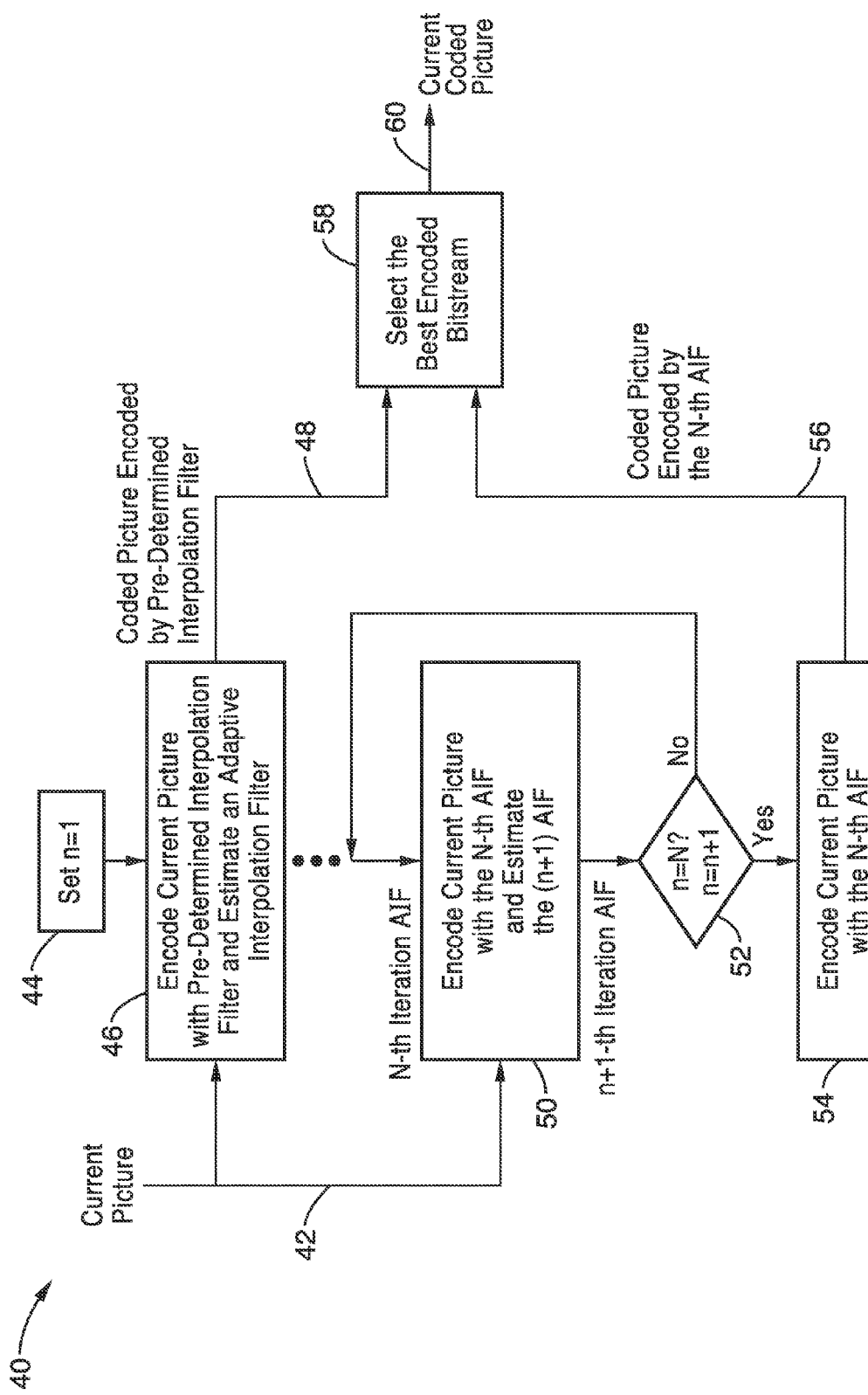
FIG. 3 is a schematic of iterative estimation of an adaptive interpolation filter according to at least one embodiment of the present invention.

FIG. 3 illustrates an example 40 according to at least one embodiment of the present invention. In the first iteration (1st pass), as set by initialization 44 of counter n, the video picture 42 is encoded 46 with a predetermined interpolation filter, while a first estimate of the interpolation filter is determined, and a first encoded output 48 generated. Then, additional interpolation filter estimates are performed 50 within additional iterations (which departs from the process described under ITU/KTA 1.8). If it is determined 52 that an insufficient number of iterations has been performed, such that a threshold condition of n=N has not been reached, then n is incremented and an additional iteration is performed. The iteration processing continues until a sufficient number of iterations has been performed. It should be appreciated that the number of iterations may be predetermined or selected in response to information or parameters obtained during training or in response to other inputs.

After the N-th iteration, the N-th estimate of the interpolation filter is used for encoding 54 the current picture again in the final (N+1) pass, to generate encoded output 56. Additional programming in the video codec is configured for selecting 58 whether the coded representation of the picture in the first pass or the final pass should be utilized as the optimal representation of the picture 60.

In testing the present invention, it was found that after four iterations (five passes), an average of 5% bitrate reduction was achieved over the first iteration for the first P picture in eight different 720P videos.

Figure 4:
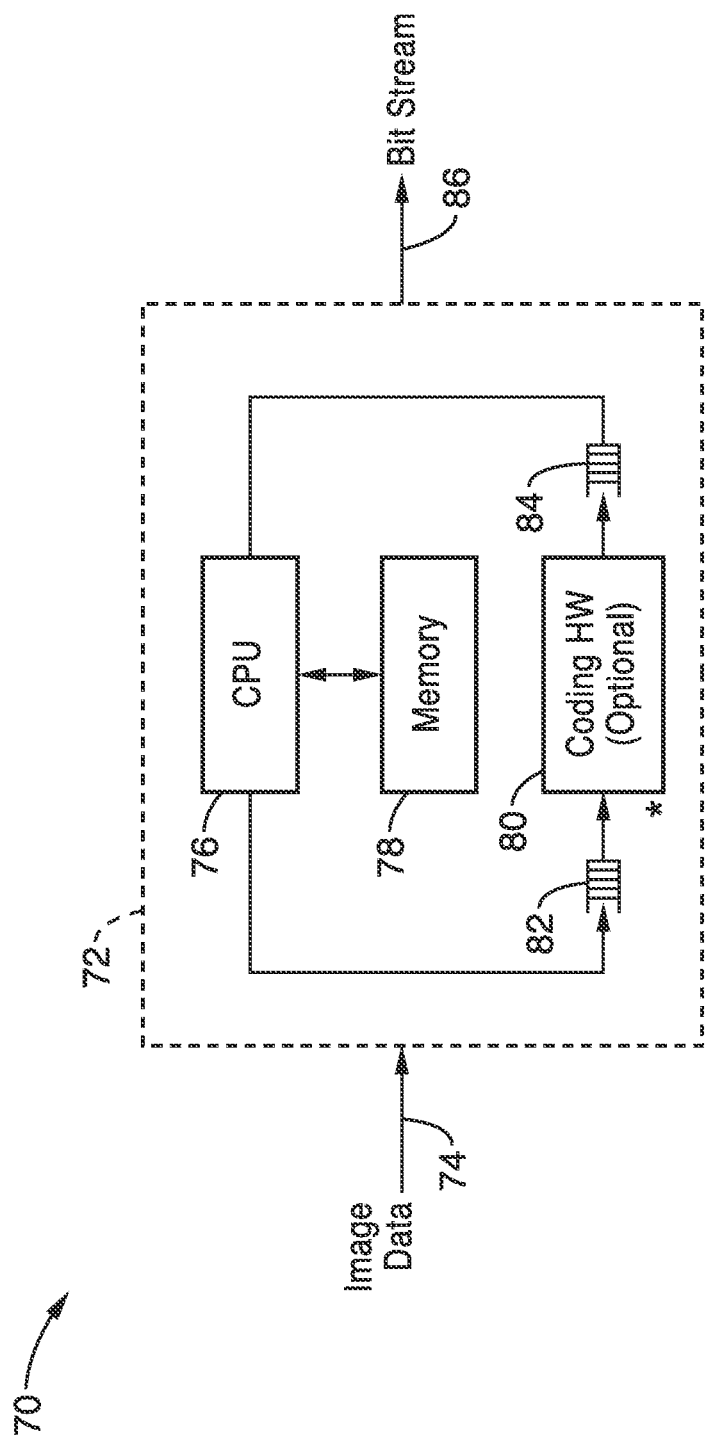
FIG. 4 is a schematic of a video encoding apparatus according to at least one embodiment of the present invention, showing a computer processor upon which programming may be executed for carrying out the encoding steps along with optional hardware acceleration.

FIG. 4 illustrates an example embodiment 70 of a video encoding apparatus 72. A computer processor is shown upon which programming may be executed for carrying out the encoding steps along with optional hardware acceleration. Encoder apparatus 72 is shown receiving image data 74 which is processed by a computer processor (CPU) 76 shown coupled to a memory 78. It should be appreciated that coder apparatus 72 can comprise one or more computer processing elements, and one or more memories, each of any desired type to suit the application, either separately or used in combination with any other desired circuitry. The coded bit stream 86 is output from block 72 in response to encoding processing which includes multiple iterations of estimating interpolation filters.

It should be appreciated that a coding apparatus according to the present invention can be implemented wholly as programming executing on a computer processor, or alternatively as a computer processor executing in combination with acceleration hardware, or solely in hardware, such as logic arrays or large scale integrated circuits. By way of example, coding hardware is represented by a block 80 which receives input through a first buffer 82, with output through a second buffer 84. If coding hardware is utilized according to the present teachings, it can be utilized to perform any desired portions of the operations recited in the description, or all of the operations thereof.

Figure 5:
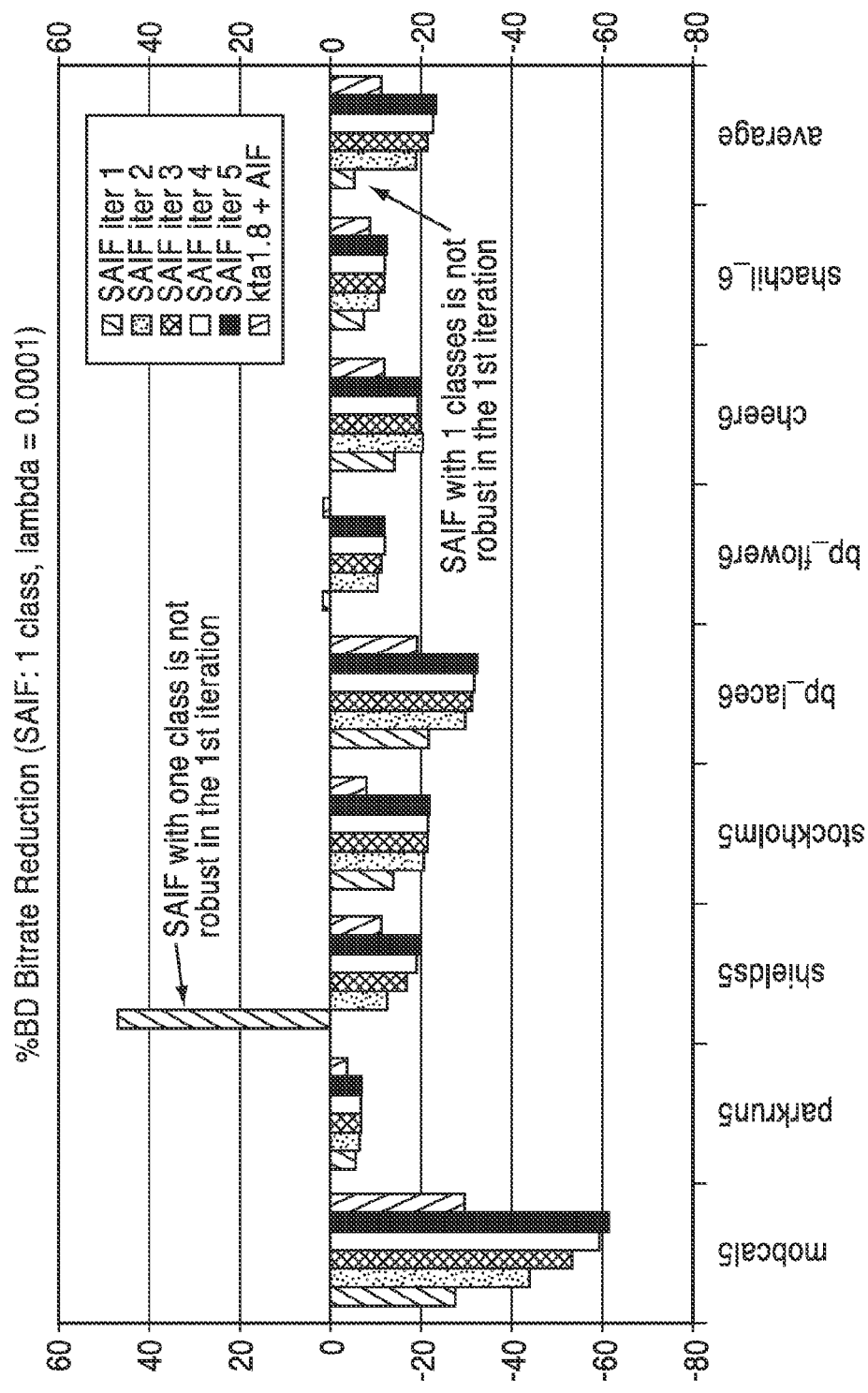
FIG. 5 is a bar chart of bit rate reduction achieved for a number of different video segments in response to the number of iterations performed according to at least one embodiment of the present invention, showing comparison with ITU/KTA 1.8 AIF.

FIG. 5 depicts bit rate reductions determined in testing of an embodiment of the present invention across a range of from 1-5 iterations as compared with ITU/KTA 1.8 AIF for a number of different 720p (pitch) videos. As seen in the figure, the video segments used in the training and testing are named "average", "shachil_6", "cheer6", "bp_flower6", "bp_lace6", "Stockholm", "shields5", "parkrun5" and "mobcal5", which exhibited a wide range of image characteristics toward facilitating an equitable comparison. The Bjontegaard Delta (BD) based bit rate reduction is shown in the bar chart with SAIF: 1 class, Lambda=0.0001. One of ordinary skill in the art will recognize the Bjontegaard Delta measure is from Gisle Bjontegaard, "Calculation of average PSNR difference between RD-curves," described in the ITU-T, document VCEG-M33. The frames tested had IPPP at QP=22, 27, 32, and 37. It will be recognized that the term IPPP refers to the coding of the 1st frame as an intra frame. Subsequent frames, referred to as P frames, are coded using the prediction from the previously coded frames. The QP is a parameter that is used for adjusting the quantizer step size for rate distortion control. The BD calculations were performed for one P frame only and do not include the overhead costs for encoding 1 SAIF interpolation filters. It will be appreciated that the use of the inventive SAIF interpolation filters with one iteration is neither robust nor efficient, wherein at least two iterations are utilized for the present technique to provide coding benefits. The average bitrate reduction from the testing seen in FIG. 5 was found to be approximately 5%.

Figure 6:
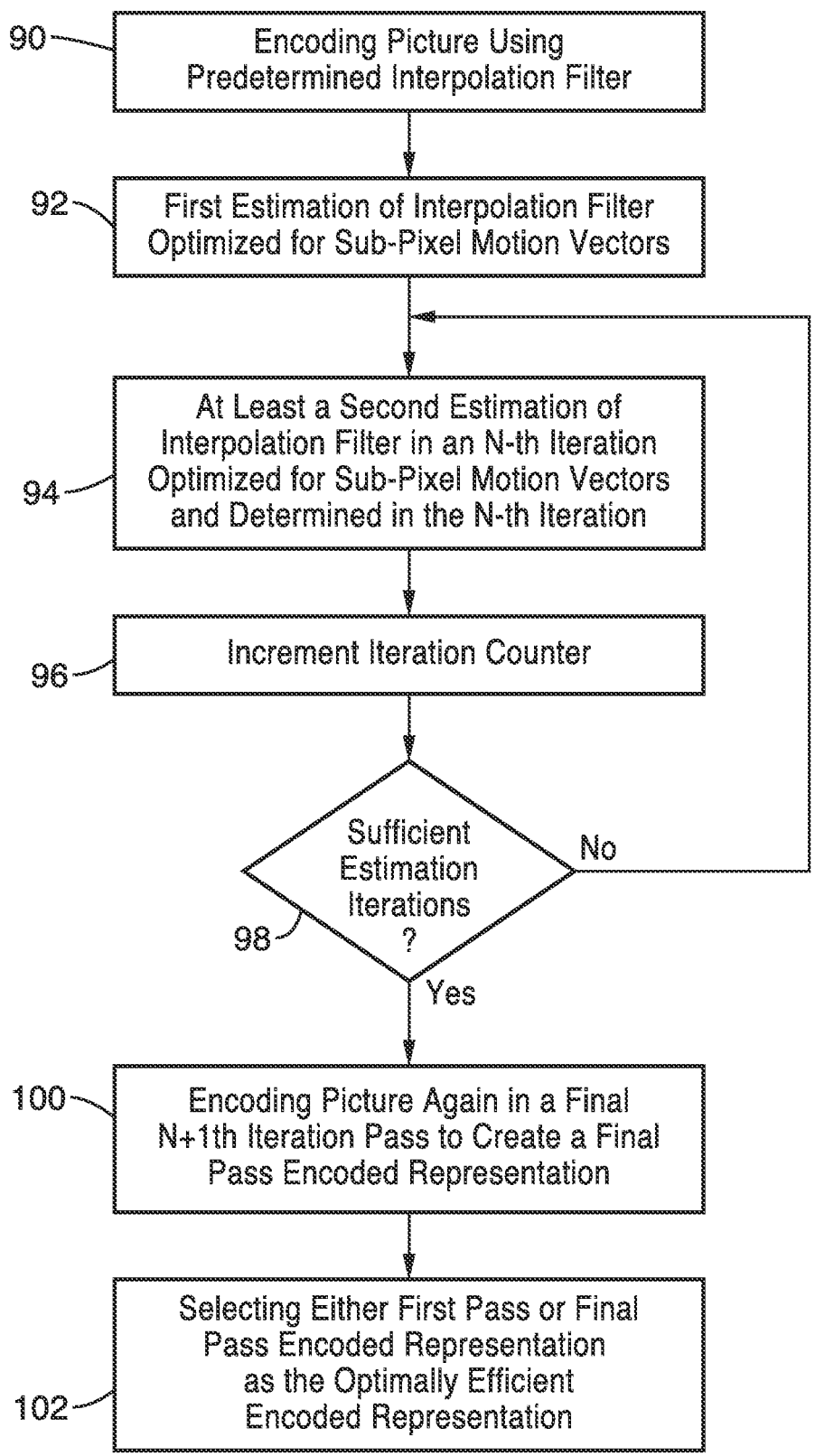
FIG. 6 is a flowchart of interactive adaptive interpolation filters according to at least one embodiment of the present invention.

FIG. 6 illustrates general steps according to at least one example embodiment of the present invention. Encoding 90 is performed on a picture from a video using a predetermined interpolation filter, in combination with making a first estimation 92 of interpolation filter in response to optimizing sub-pixel motion vectors. At least a second estimation 94 of interpolation filter is made in an n-th iteration for optimizing sub-pixel motion vectors as determined in the n-th iteration. Iteration counter is incremented 96. A determination is made 98 as to whether a sufficient number of iterations in estimating the interpolation filter have been made, such as in response to meeting a threshold condition. If not, execution returns to block 94 and another estimation iteration is performed. The picture is encoded again 100 in a final n+1th iteration pass to create a final pass encoded representation. Then a process of selecting 102 is performed of either the first pass or the final pass encoded representation as the optimally efficient encoded representation.

It will be appreciated, therefore, that the present invention provides methods and apparatus for encoding pictures within video images using multiple estimations of interpolation filters optimized for sub-pixel (sub-pel) motion vectors. Inventive teachings can be applied in a variety of apparatus and applications, including image codecs, and other imaging apparatus. From the discussion above it will be appreciated that the invention can be embodied in various ways, including the following:

1. An apparatus for optimizing encoding in a video codec, comprising: a computer configured for receiving a video having a plurality of pictures; a memory coupled to said computer; and programming configured for retention in said memory and executable on said computer for, performing first pass encoding of said plurality of pictures within said video in response to executing transforms, quantization, and filtering by a predetermined interpolation filter optimized for sub-pixel motion vectors, performing a first estimation of an interpolation filter optimized for pixel and sub-pixel motion vectors to create a first pass encoded representation, performing at least a second estimation of interpolation filter in an n-th iteration optimized for sub-pixel motion vectors determined in said n-th iteration, encoding the current picture again in a final n+1th iteration pass to create a final pass encoded representation, selecting either the first pass encoded representation or the final pass encoded representation as an optimally efficient encoded representation for the current picture, and outputting an encoded video stream of the optimally efficient encoded representation.

2. The apparatus of embodiment 1, wherein said encoding comprises a transform, a quantization, an inverse quantization, and an inverse transform.

3. The apparatus of embodiment 1, wherein each said estimation of an interpolation filter is defined in response to a set of filter coefficients.

4. The apparatus of embodiment 3, further comprising programming executable on said computer for compressing and embedding said set of filter coefficients within said encoded video stream.

5. The apparatus of embodiment 1, wherein said apparatus is configured for dynamically changing the interpolation filter on a picture-by-picture basis as the video is encoded.

6. The apparatus of embodiment 1, further comprising programming executable on said computer for determining if said n-th iteration is the last iteration prior to encoding the current picture again.

7. The apparatus of embodiment 6, wherein n of said n-th iteration is compared against a threshold value N to determine if said n-th iteration is the last iteration prior to encoding the current picture again.

8. An apparatus for optimizing encoding in a video codec, comprising: a computer configured for receiving a video having a plurality of pictures; a memory coupled to said computer; and programming executable on said computer for, encoding said plurality of pictures within said video in response to executing transforms and quantization, and in response to using a predetermined interpolation filter optimized for pixel level motion vectors and sub-pixel motion vectors, performing a first estimation of an interpolation filter optimized for sub-pixel motion vectors to create a first pass encoded representation, wherein each said estimation of an interpolation filter is defined in response to a set of filter coefficients, performing at least a second estimation of interpolation filter in an n-th iteration optimized for sub-pixel motion vectors determined in said n-th iteration, determining that said n-th iteration is the last iteration prior to encoding the current picture again, encoding the current picture again in a final n+1th iteration pass to create a final pass encoded representation, selecting either the first pass encoded representation or the final pass encoded representation as an optimally efficient encoded representation for the current picture, and outputting an encoded video stream of the optimally efficient encoded representation.

9. The apparatus of embodiment 8, wherein said encoding comprises a transform, a quantization, an inverse quantization, and an inverse transform.

10. The apparatus of embodiment 8, further comprising programming executable on said computer for compressing and embedding said set of filter coefficients within said encoded video stream.

11. The apparatus of embodiment 8, wherein said apparatus is configured for dynamically changing the interpolation filter on a picture-by-picture basis as the video is encoded.

12. The apparatus of embodiment 8, wherein n of said n-th iteration is compared against a threshold value N to determine if said n-th iteration is the last iteration prior to encoding the current picture again.

13. A method for optimizing encoding in a video codec, comprising: encoding a current picture within a video using transforms and predictions and in response to using a predetermined interpolation filter optimized for pixel level motion vectors; performing a first estimation of an interpolation filter optimized for pixel level motion vectors and sub-pixel motion vectors to create a first pass encoded representation; performing at least a second estimation of interpolation filter in an n-th iteration optimized for sub-pixel motion vectors determined in said n-th iteration; encoding the current picture again in a final n+1th iteration pass to create a final pass encoded representation; selecting either the first pass encoded representation or the final pass encoded representation as an optimally efficient encoded representation for the current picture; and outputting an encoded video stream of the optimally efficient encoded representation.

14. The method of embodiment 13, wherein said encoding comprises a transform, a quantization, an inverse quantization, and an inverse transform.

15. The method of embodiment 13, wherein each said estimation of an interpolation filter is defined in response to a set of filter coefficients.

16. The method of embodiment 15, further comprising compressing and embedding said set of filter coefficients within said encoded video stream.

17. The method of embodiment 13, wherein said method is configured for dynamically changing the interpolation filter on a picture-by-picture basis as the video is encoded.

18. The method of embodiment 13, further comprising determining if said n-th iteration is the last iteration prior to encoding the current picture again.

19. The method of embodiment 18, wherein n of said n-th iteration is compared against a threshold value N to determine if said n-th iteration is the last iteration prior to encoding the current picture again.

20. The method of embodiment 13, wherein n is equal to or greater than four.

Embodiments of the present invention are described with reference to flowchart illustrations of methods and systems according to embodiments of the invention. It will be appreciated that elements of any "embodiment" recited in the singular, are applicable according to the inventive teachings to all inventive embodiments, whether recited explicitly, or which are inherent in view of the inventive teachings herein. These methods and systems can also be implemented as computer program products. In this regard, each block or step of a flowchart, and combinations of blocks (and/or steps) in a flowchart, can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts support combinations of means for performing the specified functions, combinations of steps for performing the specified functions, and computer program instructions, such as embodied in computer-readable program code logic means, for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s).

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for optimizing encoding in a video codec, comprising:
    a computer configured for receiving a video having a plurality of pictures;
    a memory coupled to said computer; and
    programming configured for retention in said memory and executable on said computer for:
        performing first pass encoding of said plurality of pictures within said video in response to executing transforms, quantization, and filtering by a predetermined interpolation filter optimized for sub-pixel motion vectors, and estimating an adaptive interpolation filter;
        performing at least one additional iteration pass of encoding said plurality of pictures within said video in response to executing transforms, quantization, and filtering by an adaptive interpolation filter using estimates for the adaptive interpolation filter determined in a previous pass of encoding, and estimating an adaptive interpolation filter optimized for sub-pixel motion vectors;
        wherein a last said additional iteration pass of encoding is an nth pass of encoding;
        encoding the current picture again in a final n+1th iteration pass of an adaptive interpolation filter to create a final pass encoded representation;
        selecting either the first pass encoded representation or the final pass encoded representation as an optimally efficient encoded representation for the current picture; and
        outputting an encoded video stream of the optimally efficient encoded representation.

2. The apparatus recited in claim 1, wherein said encoding comprises a transform, a quantization, an inverse quantization, and an inverse transform.

3. The apparatus recited in claim 1, wherein each said estimation of an interpolation filter is defined in response to a set of filter coefficients.

4. The apparatus recited in claim 3, further comprising programming executable on said computer for compressing and embedding said set of filter coefficients within said encoded video stream.

5. The apparatus recited in claim 1, wherein said apparatus is configured for dynamically changing the interpolation filter on a picture-by-picture basis as the video is encoded.

6. The apparatus recited in claim 1, further comprising programming executable on said computer for determining if said n-th iteration is the last iteration prior to encoding the current picture again.

7. The apparatus recited in claim 6, wherein n of said n-th iteration is compared against a threshold value N to determine if said n-th iteration is the last iteration prior to encoding the current picture again.

8. An apparatus for optimizing encoding in a video codec, comprising:
    a computer configured for receiving a video having a plurality of pictures;
    a memory coupled to said computer; and
    programming executable on said computer for:
        encoding said plurality of pictures within said video in response to executing transforms and quantization, and in response to using a predetermined interpolation filter optimized for pixel level motion vectors and sub-pixel motion vectors;
        performing a first estimation of an adaptive interpolation filter, and determining a set of filter coefficients, said filter optimized for sub-pixel motion vectors to create a first pass encoded representation;
        performing at least one additional iteration pass of encoding with an additional estimation of the adaptive interpolation filter in an n-th iteration optimized for sub-pixel motion vectors determined in said n-th iteration;
        determining that said n-th iteration is the last iteration prior to encoding the current picture again;
        encoding the current picture again in a final n+1th iteration pass to create a final pass encoded representation;
        selecting either the first pass encoded representation or the final pass encoded representation as an optimally efficient encoded representation for the current picture; and
        outputting an encoded video stream of the optimally efficient encoded representation.

9. The apparatus recited in claim 8, wherein said encoding comprises a transform, a quantization, an inverse quantization, and an inverse transform.

10. The apparatus recited in claim 8, further comprising programming executable on said computer for compressing and embedding said set of filter coefficients within said encoded video stream.

11. The apparatus recited in claim 8, wherein said apparatus is configured for dynamically changing the interpolation filter on a picture-by-picture basis as the video is encoded.

12. The apparatus recited in claim 8, wherein n of said n-th iteration is compared against a threshold value N to determine if said n-th iteration is the last iteration prior to encoding the current picture again.

13. A method for optimizing encoding in a video codec, comprising:
    encoding a current picture within a video, using transforms and predictions and in response to using a predetermined interpolation filter optimized for pixel level motion vectors, and estimating an adaptive interpolation filter within a first pass of encoding;
    performing at least one additional iteration pass of encoding said picture within said video in response to executing transforms, quantization, and filtering by an adaptive interpolation filter using estimates for the adaptive interpolation filter determined in a previous pass of encoding, and estimating an adaptive interpolation filter optimized for sub-pixel motion vectors for a subsequent pass of encoding;

wherein a last said additional iteration pass of encoding is an nth pass of encoding;

encoding the current picture again in a final n+1th iteration pass to create a final pass encoded representation;

selecting either the first pass encoded representation or the final pass encoded representation as an optimally efficient encoded representation for the current picture; and outputting an encoded video stream of the optimally efficient encoded representation.

14. The method recited in claim 13, wherein said encoding comprises a transform, a quantization, an inverse quantization, and an inverse transform.

15. The method recited in claim 13, wherein each said estimation of an interpolation filter is defined in response to a set of filter coefficients.

16. The method recited in claim 15, further comprising compressing and embedding said set of filter coefficients within said encoded video stream.

17. The method recited in claim 13, wherein said method is configured for dynamically changing the interpolation filter on a picture-by-picture basis as the video is encoded.

18. The method recited in claim 13, further comprising determining if said n-th iteration is the last iteration prior to encoding the current picture again.

19. The method recited in claim 18, wherein n of said n-th iteration is compared against a threshold value N to determine if said n-th iteration is the last iteration prior to encoding the current picture again.

20. The method recited in claim 13, wherein n is equal to or greater than four.

* * * * *